United States Patent
Gousset et al.

[11] Patent Number: 5,999,418
[45] Date of Patent: Dec. 7, 1999

[54] CONTROL DEVICE FOR AN ELECTROMAGNET COIL

[75] Inventors: Alain Gousset, Nanterre; Yves Guermeur, Evreux, both of France

[73] Assignee: Schneider Electric SA, Boulogne billancourt, France

[21] Appl. No.: 09/212,482

[22] Filed: Dec. 16, 1998

[51] Int. Cl.$^6$ .......... H02M 3/335; H02M 3/24; H02M 5/42; H02M 7/00
[52] U.S. Cl. .............. 363/16; 363/82; 363/90; 363/125
[58] Field of Search .................. 363/16, 17, 18, 363/19, 22, 23, 82, 90, 81, 84, 125; 323/902

[56] References Cited

U.S. PATENT DOCUMENTS

| | | | |
|---|---|---|---|
| 4,150,423 | 4/1979 | Boschert | 363/21 |
| 5,023,766 | 6/1991 | Laidler | 363/16 |
| 5,119,283 | 6/1992 | Steigerwald et al. | 363/37 |
| 5,442,534 | 8/1995 | Cuk et al. | 363/16 |
| 5,545,971 | 8/1996 | Gomez et al. | 363/90 |
| 5,570,276 | 10/1996 | Cuk et al. | 363/16 |

FOREIGN PATENT DOCUMENTS 0 575 626 A1   12/1993   European Pat. Off. .
WO 97/40509    10/1997   WIPO .

*Primary Examiner*—Peter S. Wong
*Assistant Examiner*—Bao Q. Vu
*Attorney, Agent, or Firm*—Oblon, Spivak, McClelland, Maier & Neustadt, P.C.

[57] ABSTRACT

Device designed to control a coil forming part of a solenoid valve, for example in a contactor type device.

A switching power supply 14 includes a winding S1 powering a control circuit 15 and another winding S2 placed with a switch T2 at the coil terminals. Switch T2 is controlled by the control circuit to power the coil in the hold phase starting from the switching power supply. This reduces disturbances during the hold phase.

4 Claims, 2 Drawing Sheets

CONTROL DEVICE FOR AN ELECTROMAGNET COIL

This invention relates to a control device for an electromagnet coil, comprising a DC or rectified AC voltage source, a switch placed in series with the coil and controlled by a control circuit to determine if the coil is powered from the voltage source, the control circuit itself being powered through a power supply device connected to the voltage source.

This type of device must be capable of powering the coil in a "demand" phase, in other words in order to close the magnetic circuit of the electromagnet, and in a "hold" phase, in other words in order to hold the magnetic circuit closed.

A device used to power the coil in a demand phase by means of a current regulated by the control circuit acting on the switch is described in document FR-2748167. Current is monitored by the control circuit through a resistance in series with the coil, and it is regulated in the demand phase and in the hold phase due to the fact that the control circuit modulates pulses acting on the switch. It is observed that connecting the coil directly to the voltage source generates line disturbances particularly annoying when this source is the AC network.

The purpose of this invention is to reduce line disturbances in the hold phase of a control device of the type described, by modifying the coil power supply mode in this phase and by corresponding arrangements in the control circuit and its power supply device.

The power supply device according to the invention is a switching power supply with:
- a first winding that powers the series switch control circuit,
- a second winding provided with a second switch at the coil terminals, the second switch being controlled by the control circuit so that the coil is powered by the switching power supply in the hold phase.

This impedance matching of the coil with the voltage source due to the switching power supply, reduces firstly line disturbances, and consequently the size of the input filter, and secondly the coil overvoltage, and the required level of the corresponding protection device.

Preferably, the switching power supply is a self-oscillating flyback type power supply which comprises a third winding connected through an optocoupler to the control terminal of the second switch. It may advantageously comprise a fourth winding connected through an optocoupler to the control terminal of a third switch, the third switch being in series with the coil, whereas the second switch and the second winding are placed at the terminals of the coil—third switch assembly.

The following describes a non-restrictive embodiment of the invention, with reference to the attached drawings.

Figure 1:
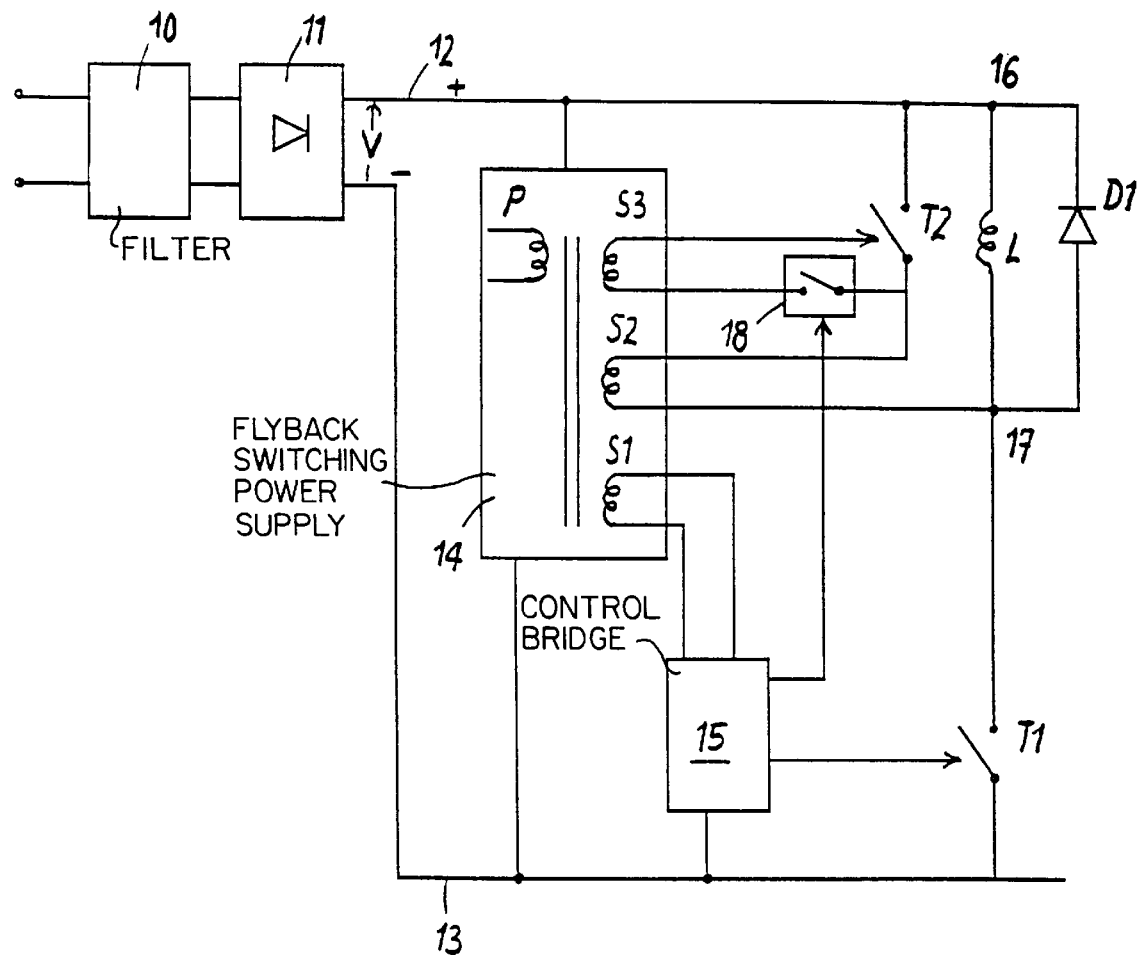
FIG. 1 shows a diagram of a control device according to the invention.

The control device shown is designed to control a coil L forming part of an electromagnet, for example in a contactor type device. It is powered from an AC or DC voltage source, at the moment from an AC network through a filter 10 and a rectifier bridge 11 outputting a rectified voltage V between a positive conductor 12 and a negative conductor 13. It includes a self-oscillating flyback type switching power supply 14 with a primary winding P connected to conductors 12, 13 and several secondary windings S1, S2, S3. Winding S1 is connected to a control circuit 15 to power this circuit; the purpose of windings S2 and S3 will be described later.

Coil L is located between conductors 12, 13, in series with an electronic switch T1 located near the negative conductor 13 and controlled by the control circuit 15. Depending on the case, switch T1 will block or enable current passing in coil L, or may modulate this current by pulses. A recovery diode D1 and an electronic switch T2 in series with winding S2, are fitted at terminals 16, 17 of coil L. Switch T2 is controlled by control circuit 15 through an isolated control device 18 such as an optotransistor in series with winding S3; this gives a floating control of T2. The indicated switches are of any appropriate type, for example transistors with MOS control or IGBT components.

Figure 2:
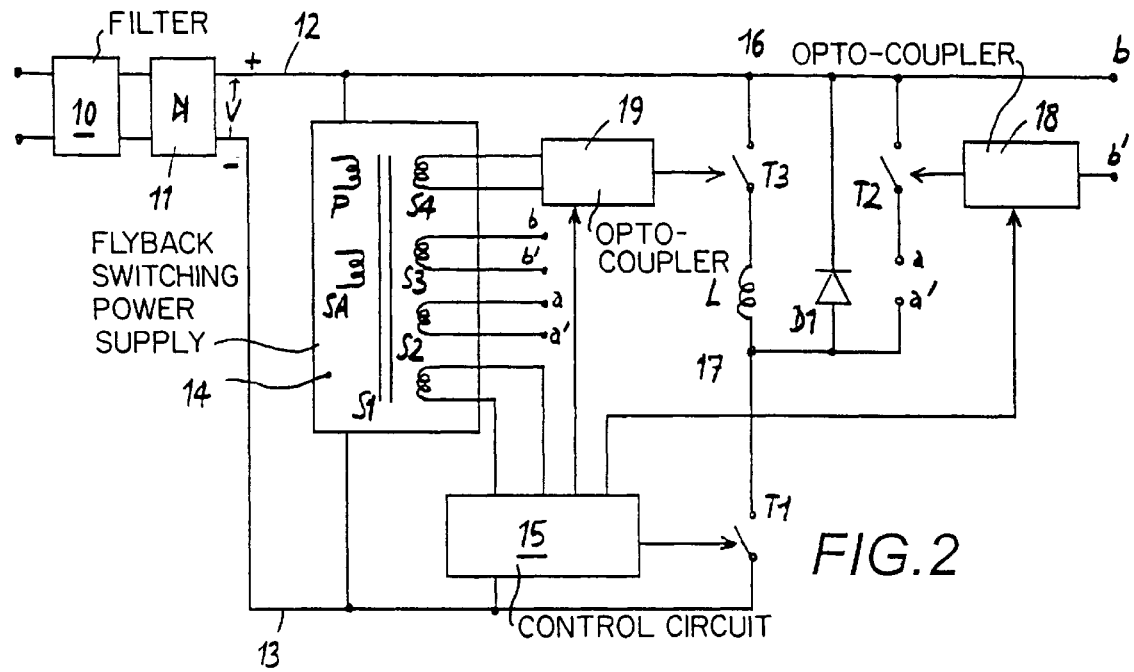
FIG. 2 shows a diagram of a preferred embodiment.

In the embodiment shown in FIG. 2, a third switch T3 is placed in series with coil L through the positive conductor 12, while being controlled from control circuit 15 through a device with isolated control 19 such as an optotransistor in series with a secondary winding S4 of the switching power supply 14. The terminals of windings S2 and S3 have been denoted by a, a' and b, b' to simplify the drawing. The assembly formed by transistor T2 and its associated winding S2 is connected to terminals 16, 17 of the assembly formed by the switch T3 and coil L.

Figure 3:
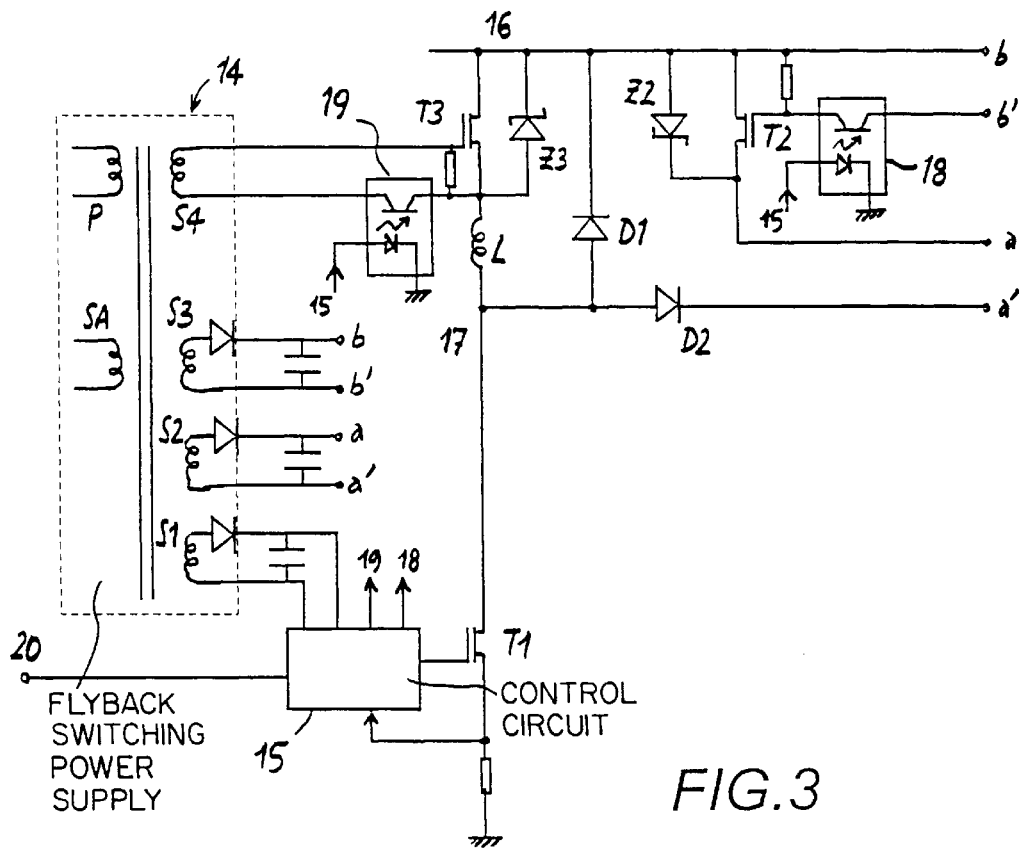
FIG. 3 shows a detail of the device in FIG. 2.

FIG. 3 shows some elements of the device in more detail. Protection devices such as Zener diodes Z2, Z3 are placed in parallel with transistors T2, T3 and a diode D2 is located between terminal a' and terminal 17 of the coil. A terminal 20 is also connected to the control circuit 15 so that it can be used by a lower level signal.

The device described operates as follows.

Operation of the device, in order to close the electromagnet magnetic circuit, is controlled by an On-Off switch not shown or by a signal addressed to terminal 20. The rectified DC voltage V is applied to the primary P of the flyback switching power supply 14. Transistors T1 and T3 are made conducting by the control circuit 15 when the voltage V exceeds a determined limit and the coil is then powered by the demand current; the level of this current is regulated by pulse modulation by circuit 15 acting on T1. When the magnetic circuit of the electromagnet is closed, which may correspond to a time-out produced by circuit 15, it blocks transistor T1 and makes transistor T2 conducting through optocoupler 18. The result is that coil L is now powered at constant voltage throughout the duration of the hold phase, from the secondary winding S2. The regulation thus achieved is a direct result of the use of the switching power supply, which is provided to power circuit 15 and transistor T3, and generates a lower coil voltage when the voltage drops and therefore the corresponding Zener diode and the filter 10 on the inlet side can be smaller.

When the network voltage drops below a threshold, the control circuit blocks the optocoupler 18 associated with transistor T2, which also blocks in turn, and the diode Z2 absorbs the overvoltage generated when the circuit is cut off. When the On-Off switch or the signal at terminal 20 changes over to switch the device off, the control circuit 15 blocks the optotransistor 19 and T3 is blocked to quickly open the magnetic circuit of the electromagnet.

We claim:

1. Control device for the demand phase and hold phase for an electromagnet coil, comprising a DC voltage source, a first switch (T1) placed in series with the coil (L) and controlled by a control circuit (15) to determine if the coil is powered from the voltage source, the control circuit being powered through a power supply device connected to the voltage source, characterized by the fact that the power supply device is a switching power supply (14) with:

a first winding (S1) powering the control circuit (15) of the first switch (T1), a second winding (S2) provided with a second switch (T2) at the coil terminals, the second switch being controlled by the control circuit (15) so that the coil is powered by the switching power supply (14) in the hold phase.

2. Control device according to claim 1, characterized by the fact that the switching power supply (14) is a self-oscillating flyback type power supply.

3. Control device according to claim 1, characterized by the fact that the switching power supply (14) contains a third winding (S3) connected through an optocoupler (18) to the control terminal of the second switch (T2).

4. Control device according to claim 1, characterized by the fact that the switching power supply (14) contains a fourth winding (S4) connected through an optocoupler (19) to the control terminal of a third switch (T3), the said third switch being in series with the coil (L), whereas the second switch (T2) and the second winding (S2) are located at the terminals of the coil (L)—third switch (T3) assembly.

* * * * *